US012750537B2

(12) United States Patent
Wang

(10) Patent No.: US 12,750,537 B2
(45) Date of Patent: Sep. 29, 2026

(54) SIGNALLING OF PRESELECTION INFORMATION IN MEDIA FILE

(71) Applicant: Bytedance Inc., Los Angeles, CA (US)

(72) Inventor: Ye-Kui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 43 days.

(21) Appl. No.: 18/807,780

(22) Filed: Aug. 16, 2024

(65) Prior Publication Data

US 2024/0406473 A1 Dec. 5, 2024

Related U.S. Application Data

(63) Continuation of application No. PCT/US2023/062764, filed on Feb. 16, 2023.

(60) Provisional application No. 63/311,342, filed on Feb. 17, 2022.

(51) Int. Cl.
*H04N 21/2343* (2011.01)

(52) U.S. Cl.
CPC ............................... *H04N 21/2343* (2013.01)

(58) Field of Classification Search
CPC ......... H04N 21/2343; H04N 21/23439; H04N 21/23614; H04N 21/8456; H04N 21/85406
See application file for complete search history.

(56) References Cited

U.S. PATENT DOCUMENTS

| | | | | |
|---|---|---|---|---|
| 10,587,883 | B2 * | 3/2020 | Wang | H04N 19/44 |
| 12,356,015 | B2 * | 7/2025 | Sodagar | H04N 19/70 |
| 2016/0373771 | A1 * | 12/2016 | Hendry | H04N 19/30 |
| 2017/0237999 | A1 * | 8/2017 | Hendry | H04N 19/39<br>375/240.26 |
| 2018/0103271 | A1 * | 4/2018 | Wang | H04L 65/65 |
| 2018/0199071 | A1 * | 7/2018 | Wang | H04N 21/85406 |
| 2018/0278964 | A1 * | 9/2018 | Wang | H04N 21/6332 |
| 2019/0012839 | A1 * | 1/2019 | Wang | G06T 19/003 |
| 2019/0014362 | A1 * | 1/2019 | Wang | H04N 21/21805 |
| 2019/0020880 | A1 * | 1/2019 | Wang | H04L 65/612 |
| 2019/0075306 | A1 * | 3/2019 | Hendry | H04N 19/39 |
| 2020/0053435 | A1 * | 2/2020 | Denoual | H04N 21/23439 |
| 2020/0077105 | A1 * | 3/2020 | Hannuksela | H04N 19/70 |

(Continued)

FOREIGN PATENT DOCUMENTS

| | | | |
|---|---|---|---|
| GB | 2582155 | A | 9/2020 |
| WO | 2020182524 | A1 | 9/2020 |
| WO | 2021093153 | A1 | 5/2021 |

OTHER PUBLICATIONS

ETSI TS 103 285—V1.3.1—Digital Video Broadcasting (DVB); MPEG-DASH Profile for Transport of ISO BMFF Based DVB Services over IP Based Networks https://share.google/0qGRSi5dqFGPxCUHs Feb. 2020.*

(Continued)

*Primary Examiner* — Jimmy H Tran
(74) *Attorney, Agent, or Firm* — Astute IP Law Group

(57) ABSTRACT

Embodiments of the present disclosure provide a solution for video processing. A method for video processing is proposed. The method comprises: performing a conversion between a bitstream of a video and a media file of the video, wherein the media file comprises a first indication identifying a preselection in the media file, and a value of the first indication is the same for all tracks contributing to the preselection.

20 Claims, 5 Drawing Sheets

(56) References Cited

U.S. PATENT DOCUMENTS

| | | | | |
|---|---|---|---|---|
| 2020/0195953 | A1* | 6/2020 | Lainema | H04N 19/46 |
| 2021/0194946 | A1* | 6/2021 | Hannuksela | H04N 21/85406 |
| 2021/0211735 | A1* | 7/2021 | Stockhammer | H04N 19/70 |
| 2021/0227231 | A1* | 7/2021 | Hannuksela | H04N 19/105 |
| 2021/0250617 | A1* | 8/2021 | Hannuksela | H04N 19/46 |
| 2022/0086430 | A1* | 3/2022 | Wang | H04N 19/132 |
| 2022/0086457 | A1* | 3/2022 | Wang | H04N 7/01 |
| 2022/0086495 | A1* | 3/2022 | Wang | H04N 19/70 |
| 2022/0086497 | A1* | 3/2022 | Wang | H04N 19/44 |
| 2022/0103865 | A1* | 3/2022 | Wang | H04N 19/132 |
| 2022/0201308 | A1* | 6/2022 | Hendry | H04N 19/176 |
| 2022/0337860 | A1* | 10/2022 | Wang | H04N 19/70 |
| 2022/0345722 | A1* | 10/2022 | Wang | H04N 19/177 |
| 2022/0360828 | A1* | 11/2022 | Huang | H04N 19/70 |
| 2023/0007210 | A1* | 1/2023 | Wang | H04N 5/45 |
| 2023/0018200 | A1 | 1/2023 | Wang | |
| 2023/0027058 | A1* | 1/2023 | Hannuksela | H04N 19/33 |
| 2023/0059516 | A1* | 2/2023 | Schwarz | H04N 19/179 |
| 2023/0276053 | A1* | 8/2023 | Gudumasu | H04N 21/8543 375/240.02 |
| 2023/0276073 | A1* | 8/2023 | Hannuksela | H04N 19/46 375/240.12 |
| 2023/0328261 | A1* | 10/2023 | Hendry | H04N 19/174 375/240.24 |
| 2023/0336753 | A1* | 10/2023 | Wang | H04N 21/26258 |
| 2023/0336761 | A1* | 10/2023 | Hendry | H04N 19/132 |
| 2023/0362456 | A1* | 11/2023 | Hendry | H04N 21/81 |
| 2024/0031622 | A1* | 1/2024 | Hendry | H04N 19/70 |
| 2024/0040169 | A1* | 2/2024 | Hendry | H04N 21/234363 |
| 2024/0048768 | A1* | 2/2024 | Hendry | H04N 19/30 |
| 2024/0129537 | A1* | 4/2024 | Sodagar | H04N 19/70 |
| 2024/0244159 | A1* | 7/2024 | Wang | H04N 19/119 |
| 2024/0244234 | A1* | 7/2024 | Wang | H04N 19/184 |
| 2024/0244244 | A1* | 7/2024 | Wang | H04N 21/4345 |
| 2024/0364959 | A1* | 10/2024 | Wang | H04N 21/23439 |
| 2024/0430478 | A1* | 12/2024 | Gudumasu | H04N 21/8456 |

OTHER PUBLICATIONS

DASH-IF IOP-5 V5.0.0 (Nov. 2021) DASH-IF Interoperability Points; Part 5: Ad Insertion in DASH https://dashif.org/docs/IOP-Guidelines/DASH-IF-IOP-Part5-v5.0.0.pdf.*

ATSC Recommended Practice: A/351:2019 Amendment No. 2, appContextId https://www.atsc.org/wp-content/uploads/2021/02/A351-2019-Amend-No. 2.pdf.*

Dolby Laboratories, "Dolby AC-4 in MPEG-DASH for Broadcast Services." (2019), Retrieved on Jun. 2, 2023 (Jun. 2, 2023), pp. 1-42.

Ilola et al., "An Overview of the MPEG Standard for Storage and Transport of Visual Volumetric Video-Based Coding", Frontiers in Signal Processing, vol. 2, Article 883943, Apr. 29, 2022, 18 pages.

International Search Report for PCT/US2023/062764, mailed Jul. 12, 2023, 4 pages.

"Information technology—Dynamic adaptive streaming over HTTP (DASH)—Part 1: Media presentation description and segment formats", International Standard, ISO/IEC 23009-1, 3rd edition, Jul. 26, 2018, 220 pages.

Extended European Search Report for European Patent Application No. 23757099.9, mailed on Nov. 28, 2025, 10 pages.

* cited by examiner

SIGNALLING OF PRESELECTION INFORMATION IN MEDIA FILE

CROSS-REFERENCE TO RELATED APPLICATIONS

This application is a continuation of International Application No. PCT/US2023/062764, filed on Feb. 16, 2023, which claims the benefit of the U.S. Provisional Application No. 63/311,342, filed on Feb. 17, 2022. The entire contents of these applications are hereby incorporated by reference in their entireties.

FIELDS

Embodiments of the present disclosure relates generally to video processing techniques, and more particularly, to signaling of preselection processing information in a media file.

BACKGROUND

Media streaming applications are typically based on the internet protocol (IP), transmission control protocol (TCP), and hypertext transfer protocol (HTTP) transport methods, and typically rely on a file format such as the ISO base media file format (ISOBMFF). One such streaming system is dynamic adaptive streaming over HTTP (DASH). In DASH, there may be multiple representations for video and/or audio data of multimedia content, different representations may correspond to different coding characteristics (e.g., different profiles or levels of a video coding standard, different bitrates, different spatial resolutions, etc.). Moreover, preselection is a set of one or multiple media components representing one version of the media presentation that may be selected by a user for simultaneous decoding and presentation. Therefore, it is worth studying on signaling of preselection processing information in a media file.

SUMMARY

Embodiments of the present disclosure provide a solution for video processing.

In a first aspect, a method for video processing is proposed. The method comprises: performing a conversion between a bitstream of a video and a media file of the video, wherein the media file comprises a first indication identifying a preselection in the media file, and a value of the first indication is the same for all tracks contributing to the preselection.

According to the method in accordance with the first aspect of the present disclosure, a value of the first indication is the same for all tracks contributing to the preselection. Compared with the conventional solution where a value of the first indication may be different for tracks contributing to the preselection, the proposed method can advantageously ensure the proper signaling of preselection processing information.

In a second aspect, an apparatus for video processing is proposed. The apparatus comprises a processor and a non-transitory memory with instructions thereon. The instructions upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by an apparatus for video processing. The method comprises: performing a conversion between the bitstream and a media file of the video, wherein the media file comprises a first indication identifying a preselection in the media file, and a value of the first indication is the same for all tracks contributing to the preselection.

In a fifth aspect, a method for storing a bitstream of a video is proposed. The method comprises: performing a conversion between the bitstream and a media file of the video; and storing the bitstream in a non-transitory computer-readable recording medium, wherein the media file comprises a first indication identifying a preselection in the media file, and a value of the first indication is the same for all tracks contributing to the preselection.

In a sixth method, another non-transitory computer-readable recording medium is proposed. The non-transitory computer-readable recording medium stores a media file of a video which is generated by a method performed by an apparatus for video processing. The method comprises: performing a conversion between a bitstream of the video and the media file, wherein the media file comprises a first indication identifying a preselection in the media file, and a value of the first indication is the same for all tracks contributing to the preselection.

In a seventh aspect, a method for storing a media file of a video is proposed. The method comprises: performing a conversion between a bitstream of the video and the media file; and storing the media file in a non-transitory computer-readable recording medium, wherein the media file comprises a first indication identifying a preselection in the media file, and a value of the first indication is the same for all tracks contributing to the preselection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
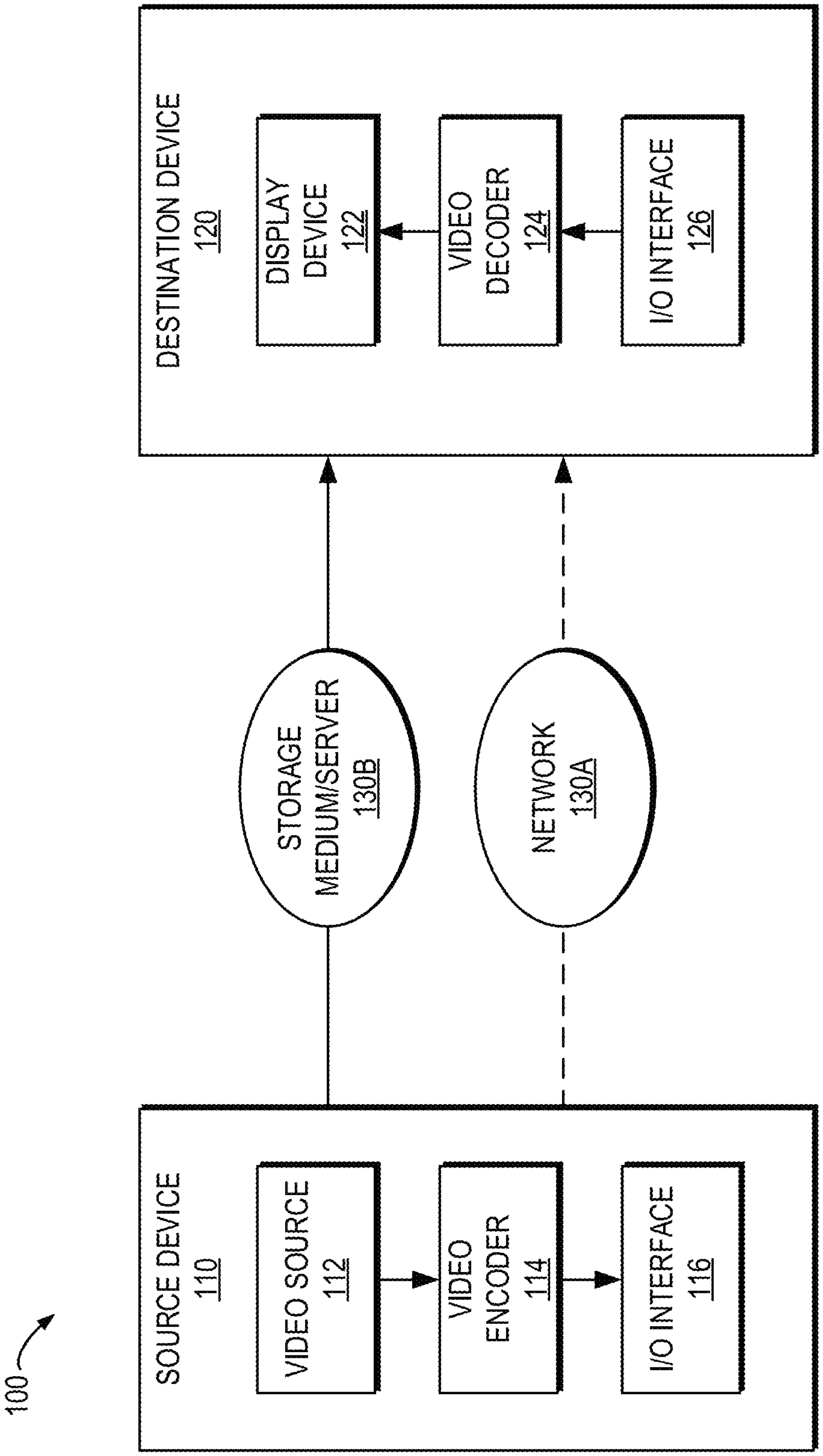
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
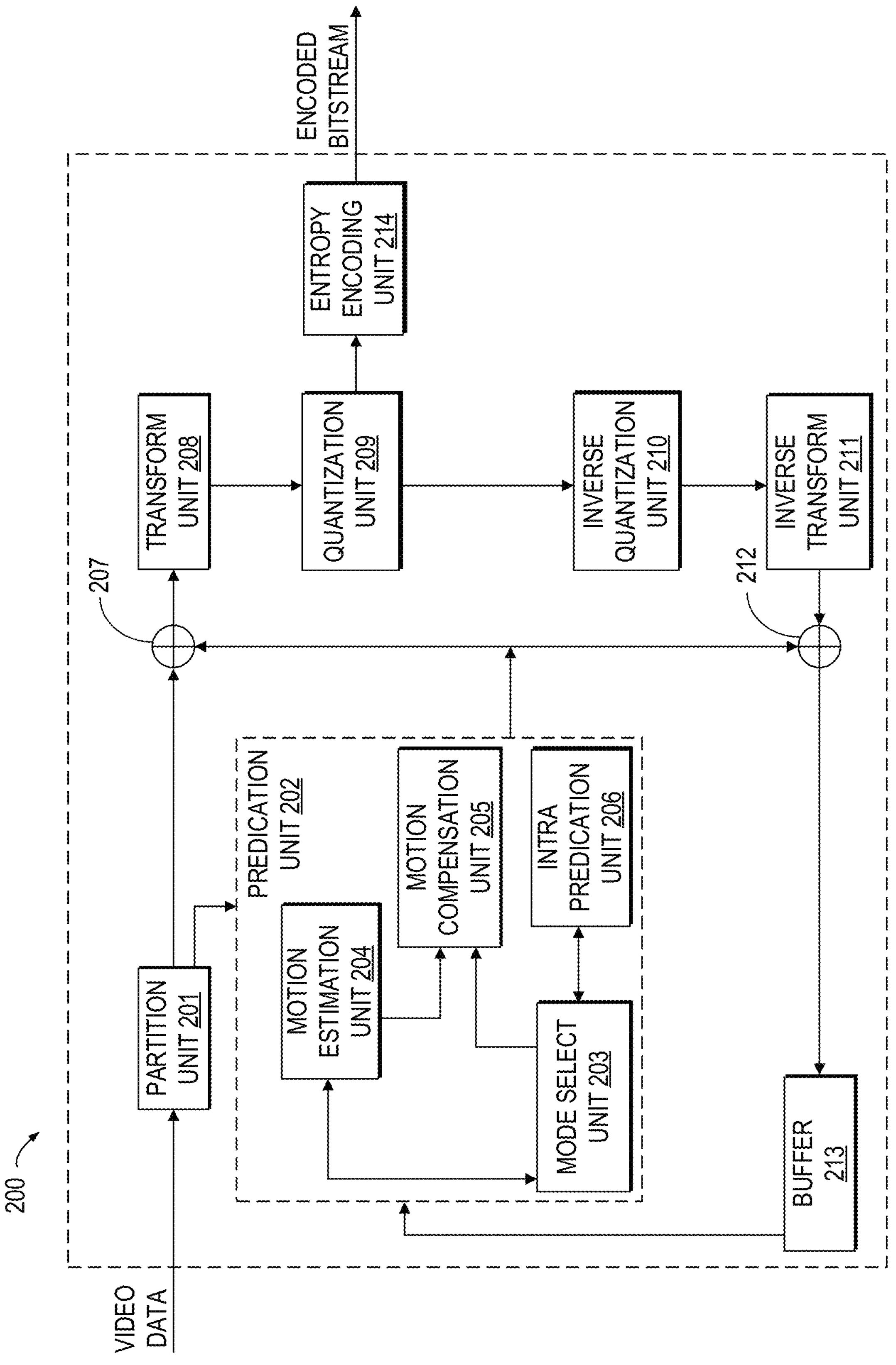
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
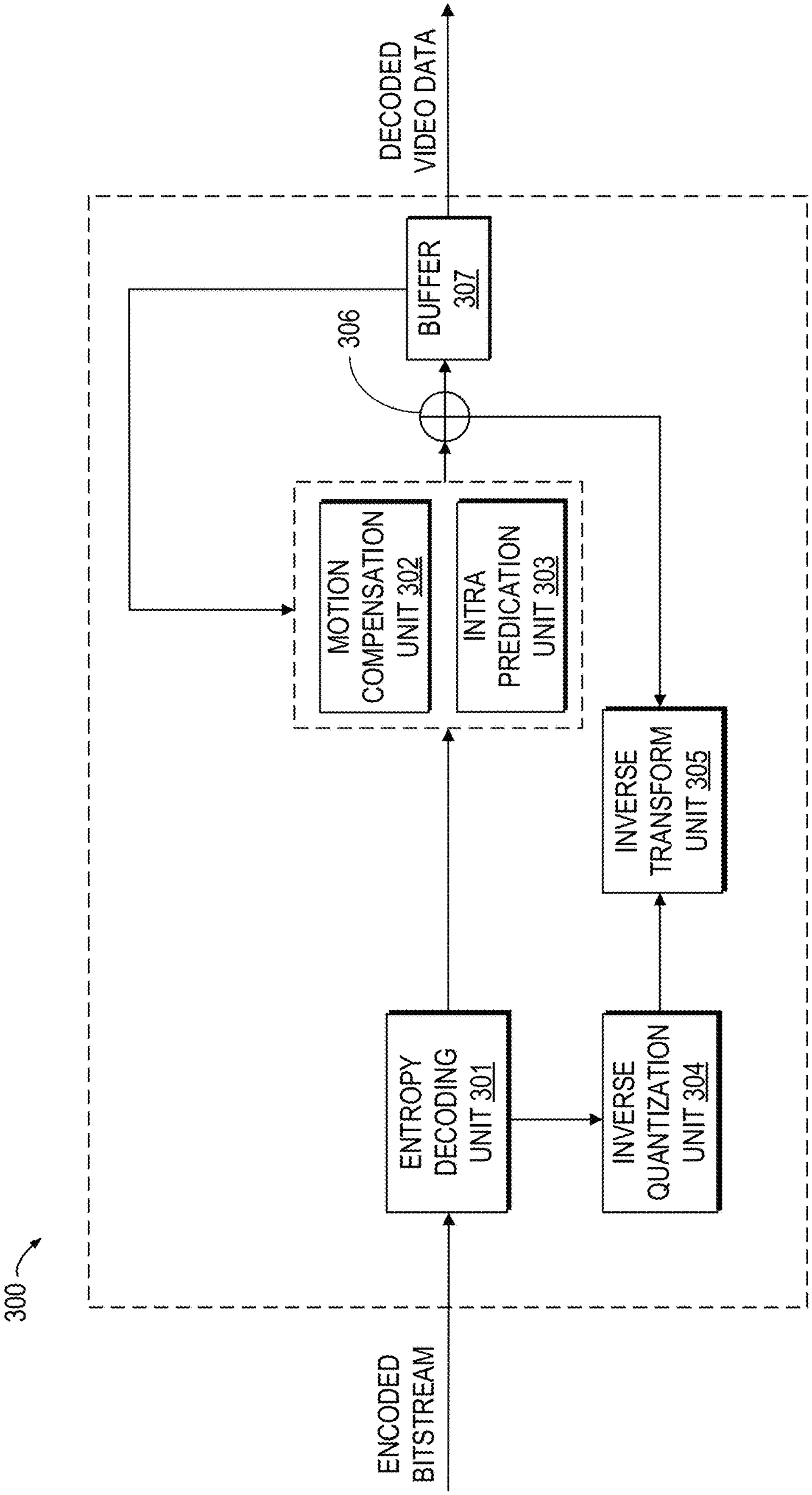
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Brief Summary

This disclosure is related to media file formats. Specifically, it is related to signalling of preselection processing information in media files, wherein a preselection is a set of one or multiple tracks and/or sub tracks representing one version of the media presentation that may be selected by a user for simultaneous decoding and presentation. The ideas may be applied individually or in various combination, to media files according to any media file formats, e.g., the ISO base media file format (ISOBMFF) and file format derived from the ISOBMFF.

2. Introduction

2.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266|ISO/IEC 23090-3) and the associated Versatile Supplemental Enhancement Information (VSEI) standard (ITU-T H.274 ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 3600 immersive media.

2.2. File Format Standards

Media streaming applications are typically based on the IP, TCP, and HTTP transport methods, and typically rely on a file format such as the ISO base media file format (ISOBMFF). One such streaming system is dynamic adaptive streaming over HTTP (DASH). For using a video format with ISOBMFF and DASH, a file format specification specific to the video format, such as the AVC file format and the HEVC file format, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session. Similarly, for using an image format with ISOBMFF, a file format specification specific to the image format, such as the AVC image file format and the HEVC image file format, would be needed.

2.3. Track Grouping and Entity Grouping

The ISOBMFF specifies both track grouping and entity grouping.

Track grouping is signalled based on the track group box that is contained in the track box. In other words, track grouping is a track-level signalling. This track group box enables indication of groups of tracks, where each group shares a particular characteristic or the tracks within a group have a particular relationship. The particular characteristic or the relationship is indicated by the box type of the boxes contained in the track group box. The boxes contained in the track group box include an identifier, which can be used to conclude the tracks belonging to the same track group. The tracks that contain the same type of a contained box within the track group box and have the same identifier value within these contained boxes belong to the same track group.

An entity group is a grouping of items, which may also group tracks. The entities in an entity group share a particular characteristic or have a particular relationship, as indicated by the grouping type. Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. GroupsListBox contains EntityToGroupBoxes, each specifying one entity group.

There are two key differences between tracking grouping and entity grouping:

1) Track grouping signalling is track-level while entity grouping for this purpose would be file level. This difference leads to the following pros and cons for these two mechanisms:
   a. A potential advantage of entity grouping is some bits saving.
   b. An arguable advantage of entity grouping is that less parsing is needed to figure out which tracks contribute to a preselection.
   c. Track grouping has a potential advantage of being more friendly to editing operations such as removing of some tracks without the need of changing the tracking group box (unless some related parameters e.g., the number of tracks is added therein).
2) Entity grouping can also be applied to items, such as image items; track grouping cannot. If there is a use case of having items in a preselection, then this is an advantage for entity grouping.

2.4. Preselection Signalling in the ISOBMFF

An amendment to the ISOBMFF standard is being developed. The latest draft specification of this amendment includes the specification of some features for signalling of preselections.

The specification of the features for signalling of preselections are as follows.

3.1 Definitions and Terms

Preselection
  a set of one or multiple sub tracks representing one version of the media presentation that may be selected by a user for simultaneous decoding/presentation Sub Track
  selectable entity within a track 8.3.4.4.3 Preselection Group Box 8.3.4.4.3.1 Definition The presence of a TrackGroupTypeBox with track_group_type equal to 'pres', which is also referred to as a PreselectionGroupBox in a track indicates that this track contributes to a preselection.

The tracks that have the same value of track_group_id within PreselectionGroupBox are part of the same preselection.

Preselections can be qualified by language, kind or media specific attributes like audio rendering indications, object interactivity or channel layouts. Attributes signalled in a preselection box shall take precedence over attributes signalled in contributing tracks.

All attributes uniquely qualifying a preselection shall be present in at least one Preselection Box of the preselection. If present in more than one Preselection Box of the preselection, the boxes containing the qualifying attributes shall be identical.

NOTE 1: Preselections group tracks of the same media type only.

Tracks containing a PreselectionGroupBox and not containing all required sub tracks for at least one preselection shall have the track_in_movie flag set to ‘0’ in their Track Header Boxes. This prevents players not understanding the Preselection Box from playing the track resulting in an incomplete experience.

8.3.4.4.3.2 Syntax

```
aligned(8) class PreselectionGroupBox extends
TrackGroupTypeBox(‘pres’, 0, flags)
{
  if (flags & 1) {
    unsigned int(8) selection__priority=1;
  }
  PreselectionInformationBox presel__info;
  PreselectionProcessingBox presel__processing;
}
```

8.3.4.4.3.3 Semantics selection_priority is an integer that declares the priority of the preselection in cases where no other differentiation such as through the media language is possible. A lower number indicates a higher priority.

presel_info is an instance of the PreselectionInformationBox( ), providing information that describes the preselection.

presel_processing is an instance of the PreselectionProcessingBox( ), providing information needed for processing the preselection.

8.3.4.4.4 Preselection Information Box 8.3.4.4.4.1 Definition

Box Type: ‘prsi’

Container: PreselectionGroupBox

Mandatory: No

Quantity: Zero or One

This Box aggregates all semantic information about the preselection.

8.3.4.4.4.2 Syntax

```
aligned(8) class PreselectionInformationBox
  extends FullBox(‘prsi’, version=0, 0 ){
  // Boxes describing the preselection
  unsigned int(8) numTracks;
}
```

8.3.4.4.4.3 Semantics

This box contains information on what experience is available when this preselection is selected. Boxes suitable to describe a preselection include but are not limited to the following list of boxes defined in this specification:

The audio object box (clause 8.3.4.4.5);

The audio object selection box (clause 8.3.4.4.7);

The extended language tag (clause 8.4.6);

The user data box (clause 8.10.1);

The track kind (clause 8.10.4);

The label box (clause 8.18.4);

The audio rendering indication (clause 8.18.5);

The channel layout (clause 12.2.4.1).

If the user data box is contained in a PreselectionBox, then it shall not carry any of the above boxes. numTracks declares how many tracks are contributing to the playout of the preselection. This value shall match the number of tracks containing a PreselectionGroupBox with the same track_group_id.

Note 1: not all tracks contributing to the playout of a preselection may be delivered in the same file.

Note2: The kind box might utilize the Role scheme defined in ISO/IEC 23009-1, clause 5.8.5.5 as it provides a commonly used scheme to describe characteristics of preselections.

Further media type specific boxes may be used to describe properties of the preselection.

8.3.4.4.9 Preselection Processing Box 8.3.4.4.9.1 Definition

Box Type: ‘prsp’

Container: PreselectionGroupBox

Mandatory: Yes

Quantity: Exactly One

This box contains information how the tracks contributing to the preselection shall be processed. Media type specific boxes may be used to describe further processing.

8.3.4.4.9.2 Syntax

```
aligned(8) class PreselectionProcessingBox
  extends FullBox(‘prsp’, version=0, flags ){
  utf8string preselection__tag;
  if (flags & 1) {
    unsigned int(8) order=0;
  }
  unsigned int(8) track__order;
  unsigned int(1) sample__merge__flag;
  unsigned int(7) reserved;
  // further attributes and Boxes defining additional processing of
  // the track contributing to the preselection
}
```

8.3.4.4.9.3 Semantics preselection_tag is a codec specific value that a playback system can provide to a decoder to uniquely identify one out of several preselections in the media.

order specifies the conformance rules for Representations in Adaptation Sets within the Preselection according to ISO/IEC 23009-1, from the following enumerated set:

0: undefined;

1: time-ordered;

2: fully-ordered.

track_order defines the order of this track for the merging process described below.

sample_merge_flag equal to 1 indicates that this track is enabled to be merged with another track as described below.

Tracks contributing to a selected preselection and having the sample_merge_flag equal to 1 shall merge their samples according to the respective media type.

If the media type does not specify such a process, contributing samples may be appended to the samples of the track with the next lower track_order. If the generated output samples from this merging process shall be embedded into a new track, this track shall be conformant to a media type derived from the base media type.

Note: for MPEG-H 3D Audio, this process is defined in ISO/IEC 23008-3, clause 14.6.

3. Problems

Existing designs for signalling of preselections in the ISOBMFF using the track grouping mechanism have the following problems regarding preselection processing information signalling:

1) There lacks a requirement that the value of preselection_tag in the PreselectionProcessingBox shall be the same for all tracks contributing to a preselection.
2) There lacks a requirement that, when a particular piece of preselection processing information is present in multiple of the tracks contributing to a preselection, that piece of preselection processing information shall be identical for the multiple tracks.
3) Many pieces of preselection processing information are repeated in all the tracks that contribute to a preselection. It would be desirable to reduce or avoid such redundancy.

4. Detailed Solutions

To solve the above problems, methods as summarized below are disclosed. The solutions should be considered as examples to explain the general concepts and should not be interpreted in a narrow way. Furthermore, these solutions can be applied individually or combined in any manner.

1) To solve the first problem, it is required that the value of preselection_tag in the PreselectionProcessingBox shall be the same for all tracks contributing to a preselection.
2) To solve the second problem, it is required that, when a particular piece of preselection processing information is present in multiple of the tracks contributing to a preselection, that piece of preselection processing information shall be identical for the multiple tracks.
   a. In one example, it is required that the preselection processing information shall be identical for all tracks contributing to a preselection.
3) To solve the third problem, one of more of the following aspects are specified:
   a. In one example, the presence of some or all pieces of the preselection processing information is controlled by a track-level flag, for which the values of 1 and 0 indicate the presence and absence, respectively, of some or all pieces of the preselection processing information in the track.
      i. In one example, the flag is required to be equal to 1 for at least one of the tracks contributing to the preselection.
      ii. In one example, the flag is allowed to be equal to 1 for more than one of the tracks contributing to the preselection.
      iii. In one example, the presence of each piece of the preselection processing information is controlled by its own presence flag.
      iv. In one example, the presence of all pieces of the preselection processing information is controlled by a single presence flag.
      v. In one example, the presence of all pieces of the preselection processing information and all pieces of the preselection description information is controlled by a single presence flag.
      vi. In one example, such a presence flag is specified by using one of the bits of the flags field of the PreselectionGroupBox.
      vii. In one example, such a presence flag is specified by using a bit in the PreselectionGroupBox but the bit is not a bit of the flags field of the PreselectionGroupBox.
   b. In one example, an indication is included in the media file to indicate one of the tracks contributing to a preselection to be the base track for the preselection, and all pieces of the preselection processing information of the preselection and all pieces of the preselection description information of the preselection are signalled in the base track.
      i. In one example, no preselection processing information of the preselection is signalled in other tracks other than the base track of the preselection.
      ii. In one example, no preselection processing information of the preselection is signalled in other tracks other than the base track of the preselection, and no preselection description information of the preselection is signalled in other tracks other than the base track of the preselection.
      iii. In one example, the base track of a preselection is indicated as follows: the presence of the preselection processing information in a track contributing to the preselection is controlled by a track-level flag, for which the values of 1 and 0 indicate the presence and absence, respectively, of the preselection processing information in the track.
         1. The flag is allowed to be equal to 1 for only one of the tracks contributing to the preselection.
         2. The flag is also required to be equal to 1 for one of the contributing tracks.
         3. The track for which the flag is equal to 1 is then the base track.
      iv. In one example, some or all pieces of the preselection processing information are allowed but are not required to be signalled in other tracks other than the base track of the preselection.
      v. In one example, the base track of a preselection is indicated as follows: the presence of both the preselection processing information and the preselection description information in a track contributing to the preselection is controlled by a track-level flag, for which the values of 1 and 0 indicate the presence and absence, respectively, of both the preselection processing information and the preselection description information in the track.
         1. The flag is allowed to be equal to 1 for only one of the tracks contributing to the preselection.
         2. The flag is also required to be equal to 1 for one of the contributing tracks.
         3. The track for which the flag is equal to 1 is then the base track.
      vi. In one example, some or all pieces of both the preselection processing information and the preselection description information are allowed but are not required to be signalled in other tracks other than the base track of the preselection.
      vii. In one example, the base track of a preselection is indicated as follows: the presence of either or both of the preselection processing information and the preselection description information in a track contributing to the preselection is controlled by a track-level flag, for which the values of 1 and 0 indicate the presence and absence, respectively, of either or both of the preselection processing information and the preselection description information in the track.
         1. The flag is allowed to be equal to 1 for only one of the tracks contributing to the preselection.
         2. The flag is also required to be equal to 1 for one of the contributing tracks.
         3. The track for which the flag is equal to 1 is then the base track.

viii. In one example, some or all pieces of either or both of the preselection processing information and the preselection description information are allowed but are not required to be signalled in other tracks other than the base track of the preselection.

5. Embodiments

Below are some example embodiments for some of the solution aspects summarized above in Section 4. Most relevant parts that have been added or modified are shown by using bolded words (e.g., this format indicates added text), and some of the deleted parts are shown by using words in italics between double curly brackets (e.g., {{this format indicates deleted text}}). There may be some other changes that are editorial in nature and thus not highlighted. Parts that remain unchanged are not included. It should be understood that only markings in this section are intended to represent changes.

5.1. First Embodiment

This embodiment is for solution item 1.

8.3.4.4.9 Preselection Processing Box 8.3.4.4.9.1 Definition

Box Type: 'prsp'

Container: PreselectionGroupBox

Mandatory: Yes

Quantity: Exactly One

This box contains information how the tracks contributing to the preselection shall be processed. Media type specific boxes may be used to describe further processing.

8.3.4.4.9.2 Syntax

```
aligned(8) class PreselectionProcessingBox
  extends FullBox('prsp', version=0, flags){
  utf8string preselection_tag;
  if (flags & 1) {
    unsigned int(8) order-0;
  }
  unsigned int(8) track_order;
  unsigned int(1) sample_merge_flag;
  unsigned int(7) reserved;
  // further attributes and Boxes defining additional processing of
  // the track contributing to the preselection
}
```

8.3.4.4.9.3 Semantics preselection_tag is a codec specific value that a playback system can provide to a decoder to uniquely identify one out of several preselections in the media. The value of preselection_tag in the PreselectionProcessingBox shall be the same for all tracks contributing to a preselection.

order specifies the conformance rules for Representations in Adaptation Sets within the Preselection according to ISO/IEC 23009-1, from the following enumerated set:

0: undefined;

1: time-ordered;

2: fully-ordered.

track_order defines the order of this track for the merging process described below.

sample_merge_flag equal to 1 indicates that this track is enabled to be merged with another track as described below.

Tracks contributing to a selected preselection and having the sample_merge_flag equal to 1 shall merge their samples according to the respective media type.

If the media type does not specify such a process, contributing samples may be appended to the samples of the track with the next lower track_order. If the generated output samples from this merging process shall be embedded into a new track, this track shall be conformant to a media type derived from the base media type.

Note: for MPEG-H 3D Audio, this process is defined in ISO/IEC 23008-3, clause 14.6.

5.2. Second Embodiment

This embodiment is for solution item 2.a.

8.3.4.4.3 Preselection Group Box 8.3.4.4.3.1 Definition

The presence of a TrackGroupTypeBox with track_ group_ type equal to 'pres', which is also referred to as a PreselectionGroupBox in a track indicates that this track contributes to a preselection.

The tracks that have the same value of track_group_id within PreselectionGroupBox are part of the same preselection.

Preselections can be qualified by language, kind or media specific attributes like audio rendering indications, object interactivity or channel layouts. Attributes signalled in a preselection box shall take precedence over attributes signalled in contributing tracks.

All attributes uniquely qualifying a preselection shall be present in at least one Preselection Box of the preselection. If present in more than one Preselection Box of the preselection, the boxes containing the qualifying attributes shall be identical.

NOTE 1: Preselections group tracks of the same media type only.

Tracks containing a PreselectionGroupBox and not containing all required sub tracks for at least one preselection shall have the track_in_movie flag set to '0' in their Track Header Boxes. This prevents players not understanding the Preselection Box from playing the track resulting in an incomplete experience.

8.3.4.4.3.2 Syntax

```
aligned(8) class PreselectionGroupBox extends
TrackGroupTypeBox('pres', 0, flags)
{
  if (flags & 1) {
    unsigned int(8) selection_priority=1;
  }
  PreselectionInformationBox presel_info;
  PreselectionProcessingBox presel_processing;
}
```

8.3.4.4.3.3 Semantics selection_priority is an integer that declares the priority of the preselection in cases where no other differentiation such as through the media language is possible. A lower number indicates a higher priority.

presel_info is an instance of the PreselectionInformationBox( ), providing information that describes the preselection.

presel_processing is an instance of the PreselectionProcessingBox( ), providing information needed for processing the preselection. The content of presel_processing shall be identical for all tracks contributing to a preselection.

5.3. Third Embodiment

This embodiment is for solution item 3.a, 3.a.i, 3.a.ii, and 3.a.iv-vi.

8.3.4.4.3 Preselection Group Box 8.3.4.4.3.1 Definition

The presence of a TrackGroupTypeBox with track_ group_ type equal to 'pres', which is also referred to as a PreselectionGroupBox in a track indicates that this track contributes to a preselection.

The tracks that have the same value of track_group_id within PreselectionGroupBox are part of the same preselection.

Preselections can be qualified by language, kind or media specific attributes like audio rendering indications, object interactivity or channel layouts. Attributes signalled in a preselection box shall take precedence over attributes signalled in contributing tracks.

All attributes uniquely qualifying a preselection shall be present in at least one Preselection Box of the preselection. If present in more than one Preselection Box of the preselection, the boxes containing the qualifying attributes shall be identical.

NOTE 1: Preselections group tracks of the same media type only.

Tracks containing a PreselectionGroupBox and not containing all required sub tracks for at least one preselection shall have the track_in_movie flag set to '0' in their Track Header Boxes. This prevents players not understanding the Preselection Box from playing the track resulting in an incomplete experience.

8.3.4.4.3.2 Syntax

```
aligned(8) class PreselectionGroupBox extends
TrackGroupTypeBox('pres', 0, flags)
{
        if (flags & 1) {
          unsigned int(8) selection__priority=1;
          PreselectionInformationBox presel__info;
          PreselectionProcessingBox presel__processing;
        }
{{      PreselectionInformationBox presel__info;
        PreselectionProcessingBox presel__processing;}}
}
```

8.3.4.4.3.3 Semantics

Among all tracks contributing to a preselection, there shall be at least one track for which the flags field of the PreselectionGroupBox satisfies the condition that (flags & 1) is equal to 1.

NOTE: It is allowed for more than one of the tracks contributing to a preselection to have the flags field of the PreselectionGroupBox satisfying the condition that (flags & 1) is equal to 1.

selection_priority is an integer that declares the priority of the preselection in cases where no other differentiation such as through the media language is possible. A lower number indicates a higher priority.

presel_info is an instance of the PreselectionInformationBox( ), providing information that describes the preselection.

presel_processing is an instance of the PreselectionProcessingBox( ), providing information needed for processing the preselection.

5.4. Fourth Embodiment

This embodiment is for solution item 3.a, 3.a.i, 3.a.ii, 3.a.iv, 3.a.vi.

8.3.4.4.3 Preselection Group Box 8.3.4.4.3.1 Definition

The presence of a TrackGroupTypeBox with track_ group_ type equal to 'pres', which is also referred to as a PreselectionGroupBox in a track indicates that this track contributes to a preselection.

The tracks that have the same value of track_group_id within PreselectionGroupBox are part of the same preselection.

Preselections can be qualified by language, kind or media specific attributes like audio rendering indications, object interactivity or channel layouts. Attributes signalled in a preselection box shall take precedence over attributes signalled in contributing tracks.

All attributes uniquely qualifying a preselection shall be present in at least one Preselection Box of the preselection. If present in more than one Preselection Box of the preselection, the boxes containing the qualifying attributes shall be identical.

NOTE 1: Preselections group tracks of the same media type only.

Tracks containing a PreselectionGroupBox and not containing all required sub tracks for at least one preselection shall have the track_in_movie flag set to '0' in their Track Header Boxes. This prevents players not understanding the Preselection Box from playing the track resulting in an incomplete experience.

8.3.4.4.3.2 Syntax

```
aligned(8) class PreselectionGroupBox extends
TrackGroupTypeBox('pres', 0, flags)
{
        if (flags & 1) {
          unsigned int(8) selection__priority=1;
        }
        if (flags & 2) {
          PreselectionInformationBox presel__info;
        }
        if (flags & 4) {
          PreselectionProcessingBox presel__processing
        }
{{      PreselectionInformationBox presel__info;
        PreselectionProcessingBox presel__processing;}}
}
```

8.3.4.4.3.3 Semantics

Among all tracks contributing to a preselection, there shall be at least one track for which the flags field of the PreselectionGroupBox satisfies the condition that (flags & 2) is equal to 1.

NOTE: It is allowed for more than one of the tracks contributing to a preselection to have the flags field of the PreselectionGroupBox satisfying the condition that (flags & 2) is equal to 1.

Among all tracks contributing to a preselection, there shall be at least one track for which the flags field of the PreselectionGroupBox satisfies the condition that (flags & 4) is equal to 1.

NOTE: It is allowed for more than one of the tracks contributing to a preselection to have the flags field of the PreselectionGroupBox satisfying the condition that (flags & 4) is equal to 1.

selection_priority is an integer that declares the priority of the preselection in cases where no other differentiation such as through the media language is possible. A lower number indicates a higher priority.

presel_info is an instance of the PreselectionInformationBox( ), providing information that describes the preselection.

presel_processing is an instance of the PreselectionProcessingBox( ), providing information needed for processing the preselection.

More details of the embodiments of the present disclosure will be described below which are related to signaling of preselection processing information in a media file. The embodiments of the present disclosure should be considered as examples to explain the general concepts and should not be interpreted in a narrow way. Furthermore, these embodiments can be applied individually or combined in any manner.

As used herein, the term "preselection" may refer to a set of one or more tracks representing one version of the media presentation for simultaneous decoding or presentation. The preselection processing information of a preselection may comprise information on how the tracks contributing to the preselection shall be processed. The preselection description information of a preselection may comprise information on what experience is available when this preselection is selected. The term "track" may refer to a timed sequence of related samples. The term "sample" may refer to all the data associated with a single time.

Figure 4:
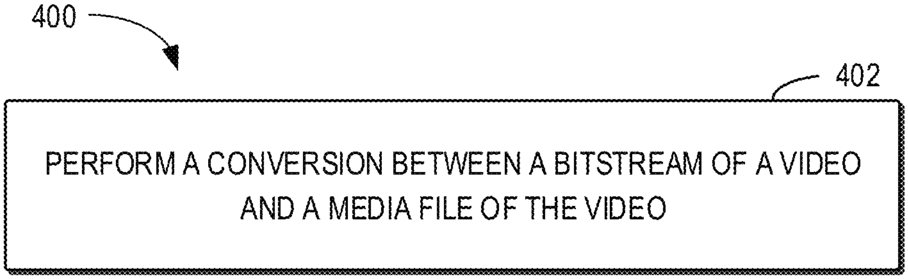
FIG. 4 illustrates a flowchart of a method for video processing in accordance with embodiments of the present disclosure.

FIG. 4 illustrates a flowchart of a method 400 for video processing in accordance with some embodiments of the present disclosure. The method 400 may be implemented at a client or a server. The term "client" used herein may refer to a piece of computer hardware or software that accesses a service made available by a server as part of the client-server model of computer networks. By way of example, the client may be a smartphone or a tablet. The term "server" used herein may refer to a device capable of computing, in which case the client accesses the service by way of a network. The server may be a physical computing device or a virtual computing device.

As shown in FIG. 4, at 402, a conversion between a bitstream of a video and a media file of the video is performed. A media file is a collection of data that establishes a bounded or unbounded presentation of media content in the context of a file format, e.g., the international organization for standardization (ISO) base media file format. In some embodiments, the conversion may comprise generating the media file and storing the bitstream to the media file. Additionally or alternatively, the conversion may comprise parsing the media file to reconstruct the bitstream.

In some embodiments, the media file may comprise a first indication identifying a preselection in the media file. By way of example rather than limitation, the first indication may be a codec specific value that a playback system can provide to a decoder to uniquely identify one preselection out of several preselections in the media file. In one example, the first indication may be a preselection_tag field. It should be understood that the first indication may also be a field represented by any other suitable string. The scope of the present disclosure is not limited in this respect.

In some embodiments, the first indication may be comprised in a track-level data structure, such as a preselection processing box. As used herein, the term "box" may refer to an object-oriented building block defined by a unique type identifier and length. In some alternative embodiments, the first indication may be comprised in a file-level data structure, such as a preselection track group entry box. It should be understood that the first indication may be comprised in any other suitable data structure. The scope of the present disclosure is not limited in this respect.

In view of the above, a value of the first indication is the same for all tracks contributing to the preselection. Compared with the conventional solution where a value of the first indication may be different for tracks contributing to the preselection, the proposed method can advantageously ensure the proper signaling of preselection processing information.

In some embodiments, if a first piece of preselection processing information of the preselection is comprised in a plurality of tracks contributing to the preselection, the first piece of preselection processing information may be identical for the plurality of tracks. In some additional embodiments, the first piece of preselection processing information may be identical for all tracks contributing to the preselection.

In some embodiments, a track-level flag in the media file may indicate whether a set of pieces of preselection processing information of the preselection are comprised in a track contributing to the preselection. By way of example rather than limitation, the track-level flag may be contained in each track in the media file. In one example, the flag may be specified by using a bit in a flags field of a preselection group box in the track. Alternatively, the flag may be specified by using a bit in a preselection group box in the track, and the bit may be not contained in a flags field of the preselection group box.

In some embodiments, if the set of pieces of preselection processing information are comprised in the track, a value of the flag may be equal to a first predetermined value. If the set of pieces of preselection processing information are absent from the track, the value of the flag may be equal to a second predetermined value. By way of example rather than limitation, the first predetermined value may be 1, and the second predetermined value may be 0. In one example, the set of pieces of preselection processing information may comprise all pieces of preselection processing information of the preselection.

In some embodiments, a value of the flag may be equal to a predetermined value for at least one of tracks contributing to the preselection. Alternatively, a value of the flag may be allowed to be equal to a predetermined value for more than one of tracks contributing to the preselection. By way of example rather than limitation, the predetermined value may be 1.

In some embodiments, whether each piece of the preselection processing information is comprised in the track may be indicated by a respective presence flag. In other words, the presence of each piece of the preselection processing information may be controlled by its own presence flag.

In some embodiments, whether all pieces of the preselection processing information are comprised in the track may be indicated by a single presence flag. In other words, all pieces of the preselection processing information may be controlled by a single presence flag.

In some embodiments, whether all pieces of the preselection processing information and all pieces of preselection description information of the preselection are comprised in the track may be indicated by a single presence flag. In other words, the presence of all pieces of the preselection processing information and all pieces of the preselection description information may be controlled by a single presence flag.

In some embodiments, the media file may comprise a third indication indicating one of tracks contributing to the preselection to be a base track for the preselection. Furthermore, all pieces of preselection processing information of the preselection, may be signaled in the base track.

In some embodiments, all pieces of the preselection processing information may be only signaled in the base track. In other words, no preselection processing information of the preselection is signaled in other tracks other than the base track of the preselection. Alternatively or additionally, all pieces of preselection description information of the preselection may be only signaled in the base track. In other words, no preselection description information of the preselection is signaled in other tracks other than the base track of the preselection.

In some embodiments, a track-level flag in the media file may indicate whether the preselection processing information is comprised in a track contributing to the preselection. If the preselection processing information is comprised in the track, a value of the flag may be equal to a first predetermined value. If the preselection processing information is absent from the track, the value of the flag may be equal to a second predetermined value. By way of example rather than limitation, the first predetermined value may be 1, and the second predetermined value may be 0.

In addition, a value of the flag may be equal to the first predetermined value for exactly a single track among the tracks contributing to the preselection. In such a case, the single track may be the base track. In some alternative embodiments, a set of pieces of the preselection processing information may be allowed to be signaled in a track different from the base track.

In some alternative embodiments, a track-level flag in the media file may indicate whether the preselection processing information and preselection description information of the preselection are comprised in a track contributing to the preselection. If the preselection processing information and the preselection description information are comprised in the track, a value of the flag may be equal to a first predetermined value. If the preselection processing information and the preselection description information are absent from the track, the value of the flag may be equal to a second predetermined value. By way of example rather than limitation, the first predetermined value may be 1, and the second predetermined value may be 0.

In addition, a value of the flag may be equal to the first predetermined value for exactly a single track among the tracks contributing to the preselection. In such a case, the single track may be the base track. In some alternative embodiments, a set of pieces of the preselection processing information and preselection processing information of the preselection may be allowed to be signaled in a track different from the base track.

Alternatively, a track-level flag in the media file may indicate whether preselection description information of the preselection is comprised in a track contributing to the preselection. If the preselection description information is comprised in the track, a value of the flag may be equal to a first predetermined value. If the preselection description information is absent from the track, the value of the flag may be equal to a second predetermined value. By way of example rather than limitation, the first predetermined value may be 1, and the second predetermined value may be 0.

In addition, a value of the flag may be equal to the first predetermined value for exactly a single track among the tracks contributing to the preselection. In such a case, the single track may be the base track. In some alternative embodiments, a set of pieces of preselection description information of the preselection may be allowed to be signaled in a track different from the base track.

According to further embodiments of the present disclosure, a non-transitory computer-readable recording medium is provided. The non-transitory computer-readable recording medium stores a bitstream of a video which is generated by a method performed by an apparatus for video processing. According to the method, a conversion between the bitstream and a media file of the video is performed. The media file comprises a first indication identifying a preselection in the media file, and a value of the first indication is the same for all tracks contributing to the preselection.

According to still further embodiments of the present disclosure, a method for storing a bitstream of a video is provided. In the method, a conversion between the bitstream and a media file of the video is performed. The media file comprises a first indication identifying a preselection in the media file, and a value of the first indication is the same for all tracks contributing to the preselection. Moreover, the bitstream is stored in the non-transitory computer-readable recording medium.

According to yet further embodiments of the present disclosure, another non-transitory computer-readable recording medium is provided. The non-transitory computer-readable recording medium stores a media file of a video which is generated by a method performed by an apparatus for video processing. According to the method, a conversion between a bitstream of the video and the media file is performed. The media file comprises a first indication identifying a preselection in the media file, and a value of the first indication is the same for all tracks contributing to the preselection.

According to still further embodiments of the present disclosure, a method for storing a media file of a video is proposed. In the method, a conversion between a bitstream of the video and the media file is performed. The media file comprises a first indication identifying a preselection in the media file, and a value of the first indication is the same for all tracks contributing to the preselection. Moreover, the media file is stored in the non-transitory computer-readable recording medium.

Implementations of the present disclosure can be described in view of the following clauses, the features of which can be combined in any reasonable manner.

Clause 1. A method for video processing, comprising: performing a conversion between a bitstream of a video and a media file of the video, wherein the media file comprises a first indication identifying a preselection in the media file, and a value of the first indication is the same for all tracks contributing to the preselection.

Clause 2. The method of clause 1, wherein the first indication is a preselection_tag field.

Clause 3. The method of any of clauses 1-2. wherein if a first piece of preselection processing information of the preselection is comprised in a plurality of tracks contributing to the preselection, the first piece of preselection processing information is identical for the plurality of tracks.

Clause 4. The method of clause 3, wherein the first piece of preselection processing information is identical for all tracks contributing to the preselection.

Clause 5. The method of any of clauses 1-4, wherein a track-level flag in the media file indicates whether a set of pieces of preselection processing information of the preselection are comprised in a track contributing to the preselection.

Clause 6. The method of clause 5, wherein if the set of pieces of preselection processing information are comprised in the track, a value of the flag is equal to a first predetermined value, and if the set of pieces of preselection processing information are absent from the track, the value of the flag is equal to a second predetermined value.

Clause 7. The method of clause 6, wherein the first predetermined value is 1, and the second predetermined value is 0.

Clause 8. The method of any of clauses 6-7, wherein the set of pieces of preselection processing information comprise all pieces of preselection processing information of the preselection.

Clause 9. The method of any of clauses 6-8, wherein a value of the flag is equal to a predetermined value for at least one of tracks contributing to the preselection.

Clause 10. The method of any of clauses 6-8, wherein a value of the flag is allowed to be equal to a predetermined value for more than one of tracks contributing to the preselection.

Clause 11. The method of any of clauses 9-10, wherein the predetermined value is 1.

Clause 12. The method of any of clauses 6-11, wherein whether each piece of the preselection processing information is comprised in the track is indicated by a respective presence flag.

Clause 13. The method of any of clauses 6-11, wherein whether all pieces of the preselection processing information are comprised in the track is indicated by a single presence flag.

Clause 14. The method of any of clauses 6-11, wherein whether all pieces of the preselection processing information and all pieces of preselection description information of the preselection are comprised in the track is indicated by a single presence flag.

Clause 15. The method of any of clauses 6-14, wherein the flag is specified by using a bit in a flags field of a preselection group box in the track.

Clause 16. The method of any of clauses 6-14, wherein the flag is specified by using a bit in a preselection group box in the track, and the bit is not contained in a flags field of the preselection group box.

Clause 17. The method of any of clauses 1-4, wherein the media file comprises a third indication indicating one of tracks contributing to the preselection to be a base track for the preselection, and all pieces of preselection processing information of the preselection are signaled in the base track.

Clause 18. The method of clause 17, wherein all pieces of the preselection processing information are only signaled in the base track.

Clause 19. The method of clause 17, wherein all pieces of preselection description information of the preselection are only signaled in the base track.

Clause 20. The method of any of clauses 17-19, wherein a track-level flag in the media file indicates whether the preselection processing information is comprised in a track contributing to the preselection, if the preselection processing information is comprised in the track, a value of the flag is equal to a first predetermined value, and if the preselection processing information is absent from the track, the value of the flag is equal to a second predetermined value.

Clause 21. The method of clause 20, wherein the first predetermined value is 1, and the second predetermined value is 0.

Clause 22. The method of any of clauses 20-21, wherein a value of the flag is equal to the first predetermined value for exactly a single track among the tracks contributing to the preselection.

Clause 23. The method of clause 22, wherein the single track is the base track.

Clause 24. The method of clause 17, wherein a set of pieces of the preselection processing information are allowed to be signaled in a track different from the base track.

Clause 25. The method of any of clauses 17-19, wherein a track-level flag in the media file indicates whether the preselection processing information and preselection description information of the preselection are comprised in a track contributing to the preselection, if the preselection processing information and the preselection description information are comprised in the track, a value of the flag is equal to a first predetermined value, and if the preselection processing information and the preselection description information are absent from the track, the value of the flag is equal to a second predetermined value.

Clause 26. The method of clause 25, wherein the first predetermined value is 1, and the second predetermined value is 0.

Clause 27. The method of any of clauses 25-26, wherein a value of the flag is equal to the first predetermined value for exactly a single track among the tracks contributing to the preselection.

Clause 28. The method of clause 27, wherein the single track is the base track.

Clause 29. The method of clause 17, wherein a set of pieces of the preselection processing information and preselection processing information of the preselection are allowed to be signaled in a track different from the base track.

Clause 30. The method of any of clauses 17-19, wherein a track-level flag in the media file indicates whether preselection description information of the preselection is comprised in a track contributing to the preselection, if the preselection description information is comprised in the track, a value of the flag is equal to a first predetermined value, and if the preselection description information is absent from the track, the value of the flag is equal to a second predetermined value.

Clause 31. The method of clause 30, wherein the first predetermined value is 1, and the second predetermined value is 0.

Clause 32. The method of any of clauses 30-31, wherein a value of the flag is equal to the first predetermined value for exactly a single track among the tracks contributing to the preselection.

Clause 33. The method of clause 32, wherein the single track is the base track.

Clause 34. The method of clause 19, wherein a set of pieces of preselection description information of the preselection are allowed to be signaled in a track different from the base track.

Clause 35. The method of any of clauses 1-34, wherein the media file is of an international organization for standardization (ISO) base media file format.

Clause 36. The method of any of clauses 1-35, wherein the conversion comprises generating the media file and storing the bitstream to the media file.

Clause 37. The method of any of clauses 1-35, wherein the conversion comprises parsing the media file to reconstruct the bitstream.

Clause 38. An apparatus for video processing comprising a processor and a non-transitory memory with instructions thereon, wherein the instructions upon execution by the processor, cause the processor to perform a method in accordance with any of clauses 1-37.

Clause 39. A non-transitory computer-readable storage medium storing instructions that cause a processor to perform a method in accordance with any of clauses 1-37.

Clause 40. A non-transitory computer-readable recording medium storing a bitstream of a video which is generated by a method performed by an apparatus for video processing, wherein the method comprises: performing a conversion between the bitstream and a media file of the video, wherein the media file comprises a first indication identifying a preselection in the media file, and a value of the first indication is the same for all tracks contributing to the preselection.

Clause 41. A method for storing a bitstream of a video, comprising: performing a conversion between the bitstream and a media file of the video; and storing the bitstream in a non-transitory computer-readable recording medium, wherein the media file comprises a first indication identifying a preselection in the media file, and a value of the first indication is the same for all tracks contributing to the preselection.

Clause 42. A non-transitory computer-readable recording medium storing a media file of a video which is generated by a method performed by an apparatus for video processing, wherein the method comprises: performing a conversion between a bitstream of the video and the media file, wherein the media file comprises a first indication identifying a preselection in the media file, and a value of the first indication is the same for all tracks contributing to the preselection.

Clause 43. A method for storing a media file of a video, comprising: performing a conversion between a bitstream of the video and the media file; and storing the media file in a non-transitory computer-readable recording medium, wherein the media file comprises a first indication identifying a preselection in the media file, and a value of the first indication is the same for all tracks contributing to the preselection.

Example Device

Figure 5:
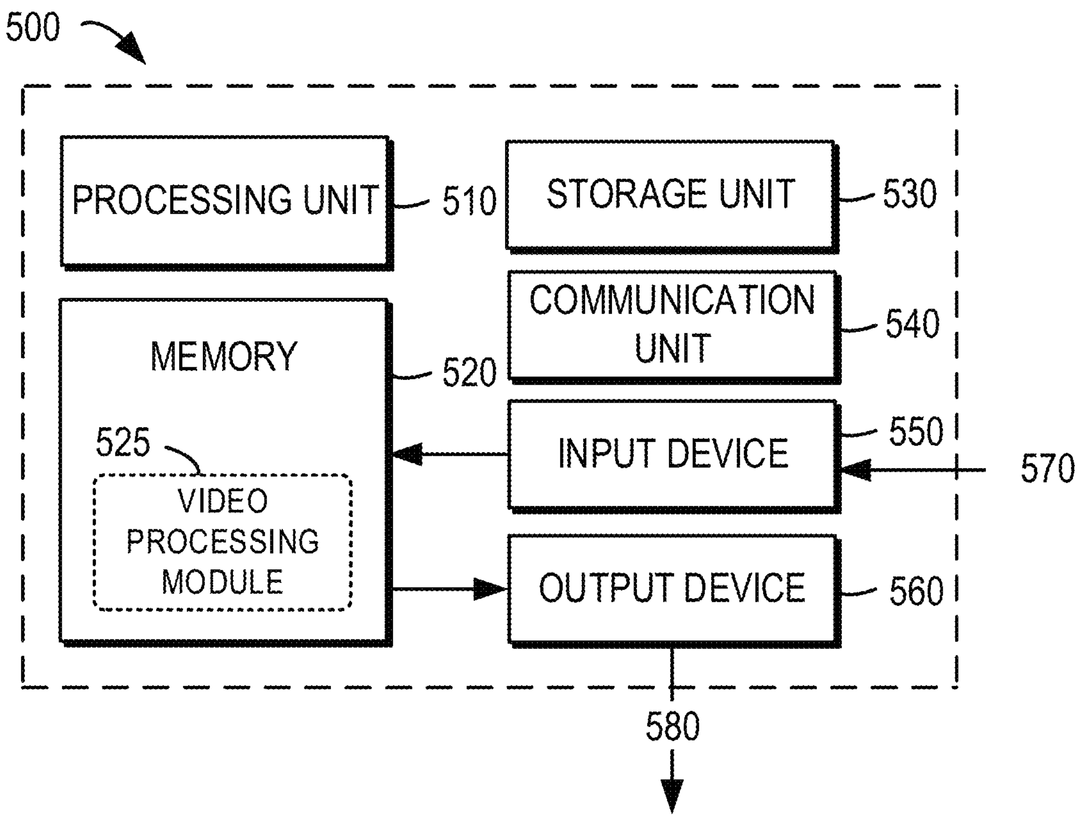
FIG. 5 illustrates a block diagram of a computing device in which various embodiments of the present disclosure can be implemented.

FIG. 5 illustrates a block diagram of a computing device 500 in which various embodiments of the present disclosure can be implemented. The computing device 500 may be implemented as or included in the source device 110 (or the video encoder 114 or 200) or the destination device 120 (or the video decoder 124 or 300).

It would be appreciated that the computing device 500 shown in FIG. 5 is merely for purpose of illustration, without suggesting any limitation to the functions and scopes of the embodiments of the present disclosure in any manner.

As shown in FIG. 5, the computing device 500 includes a general-purpose computing device 500. The computing device 500 may at least comprise one or more processors or processing units 510, a memory 520, a storage unit 530, one or more communication units 540, one or more input devices 550, and one or more output devices 560.

In some embodiments, the computing device 500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 500 can support any type of interface to a user (such as "wearable" circuitry and the like).

The processing unit 510 may be a physical or virtual processor and can implement various processes based on programs stored in the memory 520. In a multi-processor system, multiple processing units execute computer executable instructions in parallel so as to improve the parallel processing capability of the computing device 500. The processing unit 510 may also be referred to as a central processing unit (CPU), a microprocessor, a controller or a microcontroller.

The computing device 500 typically includes various computer storage medium. Such medium can be any medium accessible by the computing device 500, including, but not limited to, volatile and non-volatile medium, or detachable and non-detachable medium. The memory 520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 530 may be any detachable or non-detachable medium and may include a machine-readable medium such as a memory, flash memory drive, magnetic disk or another other media, which can be used for storing information and/or data and can be accessed in the computing device 500.

The computing device 500 may further include additional detachable/non-detachable, volatile/non-volatile memory medium. Although not shown in FIG. 5, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 540 communicates with a further computing device via the communication medium. In addition, the functions of the components in the computing device 500 can be implemented by a single computing cluster or multiple computing machines that can communicate via communication connections. Therefore, the computing device 500 can operate in a networked environment using a logical connection with one or more other servers, networked personal computers (PCs) or further general network nodes.

The input device 550 may be one or more of a variety of input devices, such as a mouse, keyboard, tracking ball, voice-input device, and the like. The output device 560 may be one or more of a variety of output devices, such as a display, loudspeaker, printer, and the like. By means of the communication unit 540, the computing device 500 can further communicate with one or more external devices (not shown) such as the storage devices and display device, with one or more devices enabling the user to interact with the computing device 500, or any devices (such as a network card, a modem and the like) enabling the computing device 500 to communicate with one or more other computing devices, if required. Such communication can be performed via input/output (I/O) interfaces (not shown).

In some embodiments, instead of being integrated in a single device, some or all components of the computing device 500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 500 may be used to implement video encoding/decoding in embodiments of the present disclosure. The memory 520 may include one or more video coding modules 525 having one or more program instructions. These modules are accessible and executable by the processing unit 510 to perform the functionalities of the various embodiments described herein.

In the example embodiments of performing video encoding, the input device 550 may receive video data as an input 570 to be encoded. The video data may be processed, for example, by the video coding module 525, to generate an encoded bitstream. The encoded bitstream may be provided via the output device 560 as an output 580.

In the example embodiments of performing video decoding, the input device 550 may receive an encoded bitstream as the input 570. The encoded bitstream may be processed, for example, by the video coding module 525, to generate decoded video data. The decoded video data may be provided via the output device 560 as the output 580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

I claim:

1. A method for video processing, comprising:

performing a conversion between a bitstream of a video and a media file of the video, wherein the media file comprises a first indication identifying a preselection in the media file, and a value of the first indication is the same for all tracks contributing to the preselection.

2. The method of claim 1, wherein the first indication is a preselection tag field.

3. The method of claim 1, wherein if a first piece of preselection processing information of the preselection is comprised in a plurality of tracks contributing to the preselection, the first piece of preselection processing information is identical for the plurality of tracks.

4. The method of claim 3, wherein the first piece of preselection processing information is identical for all tracks contributing to the preselection.

5. The method of claim 1, wherein a track-level flag in the media file indicates whether a set of pieces of preselection processing information of the preselection are comprised in a track contributing to the preselection.

6. The method of claim 5, wherein if the set of pieces of preselection processing information are comprised in the track, a value of the flag is equal to a first predetermined value, and if the set of pieces of preselection processing information are absent from the track, the value of the flag is equal to a second predetermined value.

7. The method of claim 6, wherein the first predetermined value is 1, and the second predetermined value is 0, or wherein the set of pieces of preselection processing information comprise all pieces of preselection processing information of the preselection, or wherein a value of the flag is equal to a predetermined value for at least one of tracks contributing to the preselection, or wherein a value of the flag is allowed to be equal to a predetermined value for more than one of tracks contributing to the preselection, or wherein whether each piece of the preselection processing information is comprised in the track is indicated by a respective presence flag, or wherein whether all pieces of the preselection processing information are comprised in the track is indicated by a single presence flag, or wherein whether all pieces of the preselection processing information and all pieces of preselection description information of the preselection are comprised in the track is indicated by a single presence flag, or wherein the flag is specified by using a bit in a flags field of a preselection group box in the track, or wherein the flag is specified by using a bit in a preselection group box in the track, and the bit is not contained in a flags field of the preselection group box.

8. The method of claim 1, wherein the media file comprises a third indication indicating one of tracks contributing to the preselection to be a base track for the preselection, and all pieces of preselection processing information of the preselection are signaled in the base track.

9. The method of claim 8, wherein all pieces of the preselection processing information are only signaled in the base track, or wherein all pieces of preselection description information of the preselection are only signaled in the base track.

10. The method of claim 8, wherein a track-level flag in the media file indicates whether the preselection processing information is comprised in a track contributing to the preselection, if the preselection processing information is comprised in the track, a value of the flag is equal to a first predetermined value, and if the preselection processing information is absent from the track, the value of the flag is equal to a second predetermined value.

11. The method of claim 10, wherein the first predetermined value is 1, and the second predetermined value is 0, or wherein a value of the flag is equal to the first predetermined value for exactly a single track among the tracks contributing to the preselection.

12. The method of claim 8, wherein a set of pieces of the preselection processing information are allowed to be signaled in a track different from the base track, or wherein a track-level flag in the media file indicates whether the preselection processing information and preselection description information of the preselection are comprised in a track contributing to the preselection, if the preselection processing information and the preselection description information are comprised in the track, a value of the flag is equal to a first predetermined value, and if the preselection processing information and the preselection description information are absent from the track, the value of the flag is equal to a second predetermined value.

13. The method of claim 8, wherein a set of pieces of the preselection processing information and preselection description information of the preselection are allowed to be signaled in a track different from the base track, or wherein a track-level flag in the media file indicates whether preselection description information of the preselection is comprised in a track contributing to the preselection, if the preselection description information is comprised in the track, a value of the flag is equal to a first predetermined value, and if the preselection description information is absent from the track, the value of the flag is equal to a second predetermined value.

14. The method of claim 13, wherein the first predetermined value is 1, and the second predetermined value is 0, or wherein a value of the flag is equal to the first predetermined value for exactly a single track among the tracks contributing to the preselection.

15. The method of claim 1, wherein the media file is of an international organization for standardization (ISO) base media file format.

16. The method of claim 1, wherein the conversion comprises generating the media file and storing the bitstream to the media file.

17. The method of claim 1, wherein the conversion comprises parsing the media file to reconstruct the bitstream.

18. An apparatus for video processing comprising a processor and a non-transitory memory with instructions thereon, wherein the instructions upon execution by the processor, cause the processor to perform acts comprising:

performing a conversion between a bitstream of a video and a media file of the video, wherein the media file comprises a first indication identifying a preselection in the media file, and a value of the first indication is the same for all tracks contributing to the preselection.

19. A non-transitory computer-readable storage medium storing instructions that cause a processor to perform acts comprising:

performing a conversion between a bitstream of a video and a media file of the video, wherein the media file comprises a first indication identifying a preselection in the media file, and a value of the first indication is the same for all tracks contributing to the preselection.

20. A non-transitory computer-readable recording medium storing a media file of a video which is generated by a method performed by an apparatus for video processing, wherein the method comprises:

performing a conversion between a bitstream of the video and the media file, wherein the media file comprises a first indication identifying a preselection in the media file, and a value of the first indication is the same for all tracks contributing to the preselection.

* * * * *